United States Patent
Henn et al.

(10) Patent No.: US 10,066,660 B2
(45) Date of Patent: Sep. 4, 2018

(54) REBAR SNAP HOOK

(71) Applicant: Reliance Industries, LLC, Wheat Ridge, CO (US)

(72) Inventors: Dan Henn, Spring Branch, TX (US); Gary E. Choate, Lakewood, CO (US); Tim Ecker, Arvada, CO (US)

(73) Assignee: RELIANCE INDUSTRIES, LLC, Wheat Ridge, CO (US)

( * ) Notice: Subject to any disclaimer, the term of this patent is extended or adjusted under 35 U.S.C. 154(b) by 0 days.

(21) Appl. No.: 15/299,223

(22) Filed: Oct. 20, 2016

(65) Prior Publication Data

US 2017/0114824 A1    Apr. 27, 2017

Related U.S. Application Data

(60) Provisional application No. 62/245,075, filed on Oct. 22, 2015.

(51) Int. Cl.
*F16B 45/02* (2006.01)

(52) U.S. Cl.
CPC .................................. *F16B 45/02* (2013.01)

(58) Field of Classification Search
CPC .............................. B65G 63/025; F16B 45/02
See application file for complete search history.

(56) References Cited

U.S. PATENT DOCUMENTS

| | | |
|---|---|---|
| 741,014 A | 10/1903 | Covert |
| 939,727 A | 11/1909 | Maki |
| 1,521,811 A | 1/1925 | Hartbauer |
| 1,546,208 A | 7/1925 | Cunningham |
| 1,626,866 A | 5/1927 | Nelson |
| 1,711,346 A | 4/1929 | Greve |
| 1,879,168 A | 9/1932 | Freysinger |
| 1,949,608 A | 3/1934 | Johnson |
| 1,964,428 A | 6/1934 | Duffy |
| 2,490,931 A | 12/1949 | Thompson |
| 3,918,758 A | 11/1975 | Fournier |
| 4,062,092 A | 12/1977 | Tamada et al. |
| 4,279,062 A | 7/1981 | Boissonnet |
| 4,434,536 A | 3/1984 | Schmidt et al. |
| 4,440,432 A | 4/1984 | Goris |
| 4,528,728 A | 7/1985 | Schmidt et al. |
| 4,539,732 A | 9/1985 | Wolner |
| 4,554,712 A | 11/1985 | Le Beon |
| 4,621,851 A | 11/1986 | Bailey, Jr. |

(Continued)

FOREIGN PATENT DOCUMENTS

| | | |
|---|---|---|
| DE | 20200401008 U1 | 11/2004 |
| JP | 07031687 A | 2/1995 |

*Primary Examiner* — Robert Sandy
*Assistant Examiner* — David M Upchurch
(74) *Attorney, Agent, or Firm* — Sandber Phoenix & von Gontard P.C.

(57) ABSTRACT

A snap hook assembly includes a hook body defining a neck portion and a hook portion which form a capture area. A gate and a trigger are both pivotally mounted to the hook body. The gate is moveable between a closed position and an open position and is biased to the closed position. The snap hook is configured such that, when the gate is in the closed position, it cannot be moved to the opened position. The trigger is operable to release the gate, so that the gate can be moved from the closed position to the opened position.

15 Claims, 14 Drawing Sheets

(56) References Cited

U.S. PATENT DOCUMENTS

| | | | |
|---|---|---|---|
| 4,908,913 A | 3/1990 | Mori | |
| 4,977,647 A | 12/1990 | Casebolt | |
| 5,002,420 A | 3/1991 | Loyd | |
| 5,579,564 A | 12/1996 | Rullo et al. | |
| 5,694,668 A | 12/1997 | Rohlf | |
| 5,735,025 A | 4/1998 | Bailey | |
| 6,161,264 A | 12/2000 | Choate | |
| 6,283,524 B1 | 9/2001 | Simond | |
| 6,718,601 B1 | 4/2004 | Choate | |
| 6,832,417 B1 | 12/2004 | Choate | |
| 7,636,990 B1 | 12/2009 | Choate | |
| 7,647,677 B2 | 1/2010 | Casebolt | |
| 8,015,676 B1 * | 9/2011 | Choate | F16B 45/02 24/599.5 |
| 8,572,819 B2 | 11/2013 | Yang | |
| 8,752,254 B2 | 6/2014 | Perner | |
| 9,328,765 B2 | 5/2016 | Perner | |
| 2007/0062014 A1 | 3/2007 | Casebolt | |
| 2008/0104809 A1 | 5/2008 | Lin | |
| 2008/0120818 A1 | 5/2008 | Belcourt et al. | |
| 2008/0127465 A1 | 6/2008 | Lin | |
| 2008/0185848 A1 | 8/2008 | Coulombe | |
| 2010/0299893 A1 | 12/2010 | Liang | |
| 2011/0113603 A1 | 5/2011 | Yang | |
| 2011/0126386 A1 | 6/2011 | Liang | |
| 2013/0025095 A1 | 1/2013 | Yang | |
| 2013/0219673 A1 * | 8/2013 | Perner | F16B 45/02 24/375 |
| 2014/0110956 A1 * | 4/2014 | Lin | F16B 45/02 294/82.2 |
| 2014/0230199 A1 | 8/2014 | Perner | |
| 2015/0231423 A1 | 8/2015 | Perner | |

* cited by examiner

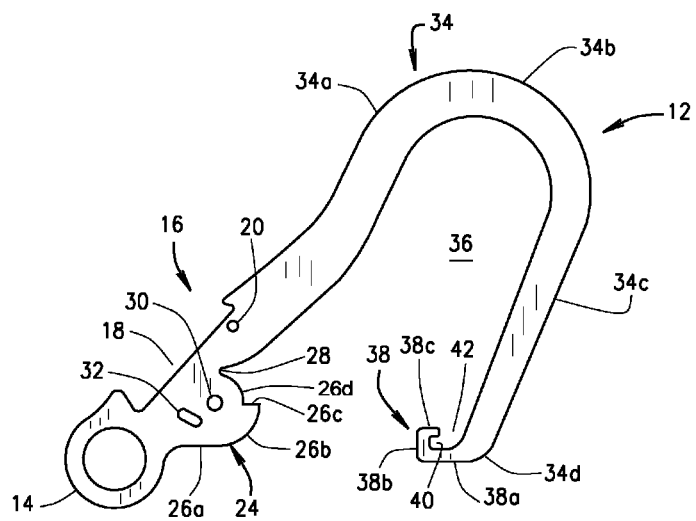
FIG. 3
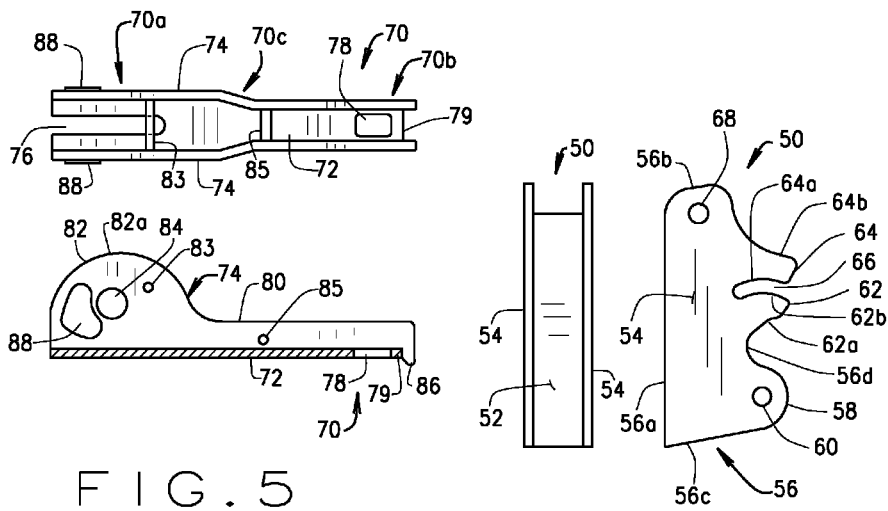
FIG. 5
FIG. 4

REBAR SNAP HOOK

CROSS-REFERENCE TO RELATED APPLICATIONS

This application claims priority to U.S. Pat. App. No. 62/245,075 filed Oct. 22, 2015 and entitled Rebar Snap Hook, said application being incorporated herein by reference.

STATEMENT REGARDING FEDERALLY SPONSORED RESEARCH OR DEVELOPMENT

Not Applicable.

BACKGROUND OF THE INVENTION

This application relates to fall protection equipment, and, in particular, to a gated rebar snap hook which is used to anchor a worker, via a lanyard to an anchor point, such as existing rebar in a construction site.

It is not uncommon in the construction and building repair industries, and in other related industries, for individuals to work at elevated work positions, such as, for example during the construction or repair of the upper floors of a multistory building. A number of safety devices are used in such a situation. For example, safety harnesses and retractables are devices that are designed to allow an individual to operate safely at what would otherwise be dangerous or deadly heights without risk of harm. A self-retracting lanyard (retractable) comprises a cable or webbing, known as a lifeline, that is held in the retractable on a reel. When the lifeline is pulled from the retractable at a relatively slow rate, such as when the user is moving about but not falling, the retractable allows the reel to unwind and the lifeline to extend from the retractable. A safety harness can be attached to the end of the lifeline to secure the individual to the retractable.

Either the lifeline or the retractable is connected to an anchor. The anchor point can often be a cylindrical post or rebar, and in this situation, a snap hook is typically used to connect the retractable to the anchor. Gated hooks (i.e., a hook with a gate extending across the hook opening) have been developed to help reduce the possibility of the hook from disengaging the anchor, and to reinforce the hook against forces imposed on the hook when attached to a generally vertical bar (and when the hook is therefore more horizontal than vertical).

BRIEF SUMMARY OF THE INVENTION

Briefly stated, a snap hook assembly comprises a hook body, a gate and a trigger. The hook body comprises a neck portion and a hook portion extending from the neck portion and which defines a hook area. The body can also include a connecting ring at a bottom of the neck portion. The hook portion comprises a back section extending from said neck, a curved section extending from a top of the back section, and a forward section extending from said curved section. A distal end of the forward section defines an end of the hook portion. A locking arm extends from the end of the hook portion toward the neck portion. The locking arm comprises a base portion extending from the end of the hook portion, a first leg extending upwardly from the base portion, and a second leg extending from an end of the first leg toward the hook body forward portion. The locking arm base, first leg and second leg define a capture area, and the gap between the end of the second leg and the hook portion forward section define an entrance to the capture area. The base portion of the locking arm can extend generally perpendicularly from the end of the hook portion of the body.

The gate has a first end and a second end. The gate is pivotally mounted at its first end to the hook body. At its second end, the gate defines an opening sized to pass over the locking arm second leg and a gate cross-member sized to pass through the entrance to the capture area. The gate is selectively pivotally movable between a closed position in which the gate cross-member rests on the locking arm base to close an opening to the hook area and an open position in which the opening to the hook area is opened to allow the snap hook to be connected to, or removed from, an anchor point.

In a first embodiment, the snap hook assembly includes a locking member which extends along the gate. The locking member comprises a cross-member sized to be received in the capture area of the body locking arm. The locking member is movable relative to the gate and the body locking arm between a locking position in which the locking member cross-member is received in the capture area to prevent pivotal motion of the gate and a release position in which cross-member of the locking member is aligned with the entrance to the capture area so as to not interfere with pivotal movement of the gate.

In this embodiment, the trigger is pivotally mounted at a trigger pivot point to the hook body and is connected to the locking member at a point spaced from said trigger pivot point. The trigger is movable between a lock position in which the cross-member of the locking member is received in the capture area of the hook portion locking arm and a release position in which cross-member of the locking member is in its release position; whereby the selective pivoting movement of the trigger between its lock and release positions moves the locking member between its the locked and released positions.

The snap hook assembly further includes a gate biasing member for biasing the gate to the closed position and a trigger biasing member for biasing the trigger to the first position.

In accordance with an aspect of the snap hook assembly, the gate biasing member comprises a torsion spring having a first leg and a second leg. The first leg of the torsion spring extends along the gate and defines the locking member.

In accordance with another aspect of the snap hook assembly, the snap hook assembly includes a one piece complex torsion spring having a first leg, a second leg, and a third leg, wherein the first and second legs are joined by a first coil and the second and third legs are joined by a second coil. The gate biasing member comprises the first and second legs of the complex torsion spring and the trigger biasing member comprises the second and third legs of the complex torsion spring. The first, second, and third legs of the complex torsion spring are positioned relative to the trigger, hook body, and gate, such that the first and second legs bias the trigger to its lock position and the second and third legs bias the gate to its closed position. Further, the third leg extends along the gate and defines the locking member. Thus, the complex torsion spring serves a dual purpose—it biases the trigger and gate to their lock and closed positions, respectively, and functions as the lock member to, at least in part, prevent pivoting of the gate from its closed position.

In accordance with another aspect of the snap hook assembly, the trigger defines an arcuate channel extending rearwardly from a front edge thereof; and the gate comprises a locking pin extending through a plane in which the gate pivots. The trigger channel and the gate locking pin are positioned on the trigger and gate, respectively, such that when the trigger is in its release position, the gate locking pin is aligned with the trigger channel to permit movement of the gate from its closed position to its open position; and wherein when the trigger is in its lock position, the gate locking pin is not aligned with the channel and abuts a forward surface of the trigger, such that pivotal motion of the gate from its closed position is substantially prevented.

In accordance with an aspect of the snap hook assembly, the hook body includes an elongate slot which extends parallel to the direction of travel of the locking member. A connecting pin extends through the slot of the hook body and the lock mechanism and is connected at opposite ends to said trigger, such that the connecting pin connects the locking member to the trigger.

In a variation of this embodiment, the trigger is movable along the hook body between a first position in which the trigger can pivot between its lock and release positions and a second position in which pivotal motion of the trigger is prevented. When the trigger is in the second position, the gate is in its closed position and the locking member cross-member is captured in the locking arm capture area.

In accordance with an aspect of this variation, hook body includes a first slot and a second slot extending form the first slot. The first slot extends generally parallel to the direction of travel of the locking mechanism and the second slot extends generally parallel to the direction parallel to the direction of travel of the trigger. When the trigger is in its first position, the connecting pin is aligned with the first slot to travel in the first slot, and when the trigger is in its second position, the connecting pin is received in the second slot and is out of alignment with the first slot.

In a second embodiment, the snap hook assembly comprises a hook body, a gate and, a trigger. Additionally, the snap hook assembly includes a gate biasing member and a trigger biasing member. The hook is as described above.

The gate has a first end and a second end, with the gate being connected at its first end to the body to move both pivotally and laterally relative to the body. The gate second end defines an opening sized to pass over the locking arm second leg and a gate cross-member sized to pass through the entrance to the capture area and to be received in the capture area. The gate is pivotally movable between a closed position in which the gate cross-member rests on the locking arm base to close an opening to the hook area and an open position in which the opening to said hook area is opened to allow the snap hook to be connected to, or removed from, an anchor point. Further, when in the closed position, the gate is movable laterally between a locked position in which gate cross-member is received in the capture area to prevent movement of the gate from its closed position to its open position and a release position in which the gate opening is aligned with the body locking arm second leg and the gate cross-member is aligned with the opening to the capture area whereby the gate may be pivoted between its closed and opened positions.

A trigger is pivotally mounted to the hook body and is connected to the gate. The trigger is movable between a lock position and a release position; whereby, when the trigger is in its lock position, the gate cross-member is received in the capture area of the hook portion locking arm, and when the trigger is in its release position, the gate is in its release position. The selective movement of the trigger between its locked and release positions moves the gate between its said locked and released positions.

In accordance with an aspect of this embodiment, the gate comprises a locking pin extending through a plane in which the gate pivots, and the hook body comprises a slot extending rearwardly from an inner surface of the body. The slot is aligned with the gate locking pin. The gate locking pin is positioned on the gate such that when the gate is in its locked position, the gate locking pin is received in the body channel to prevent pivotal motion of the gate, and when the gate is in its release position, the gate locking pin is outside of the channel to permit pivotal motion of the gate.

BRIEF DESCRIPTION OF THE SEVERAL VIEWS OF THE DRAWINGS

FIG. 3 is a side elevational view of a body of the snap hook assembly;

FIG. 4 contains side elevational and top plan views of a trigger of the snap hook assembly;

FIG. 5 contains side elevational and cross-sectional views of a gate of the snap hook assembly;

Corresponding reference numerals will be used throughout the several figures of the drawings.

DETAILED DESCRIPTION OF THE INVENTION

Figure 1:
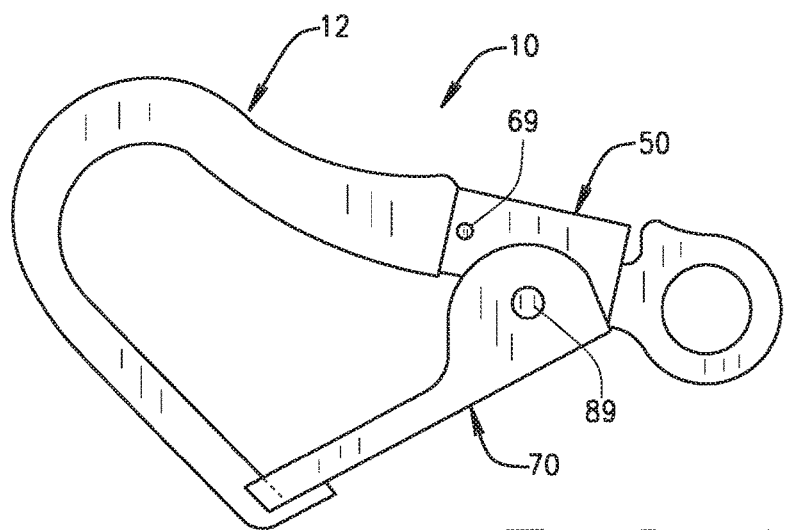
FIG. 1 is a side view of a snap hook assembly with a spring lock mechanism.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 2:
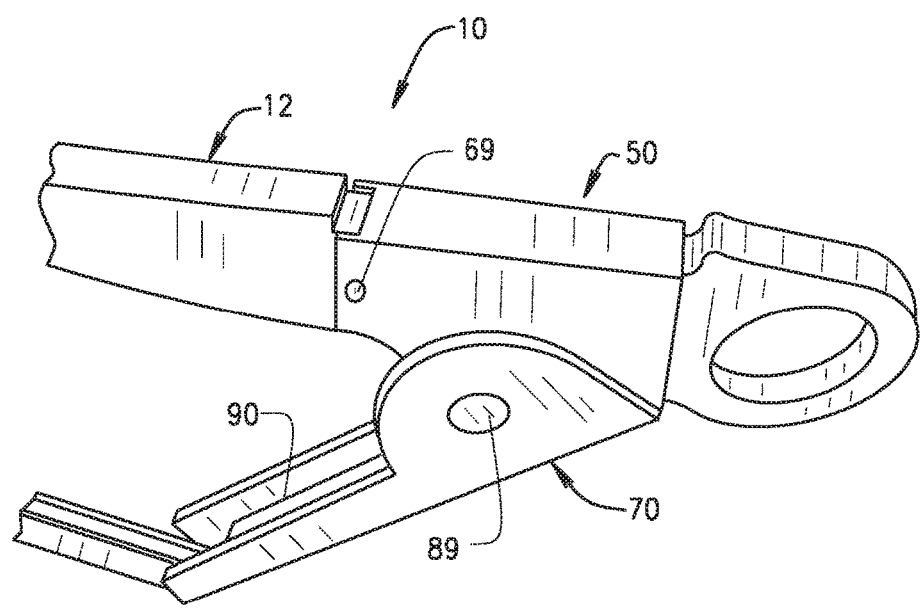
FIG. 2 is a fragmentary perspective view of the snap hook assembly.
Figure 9:
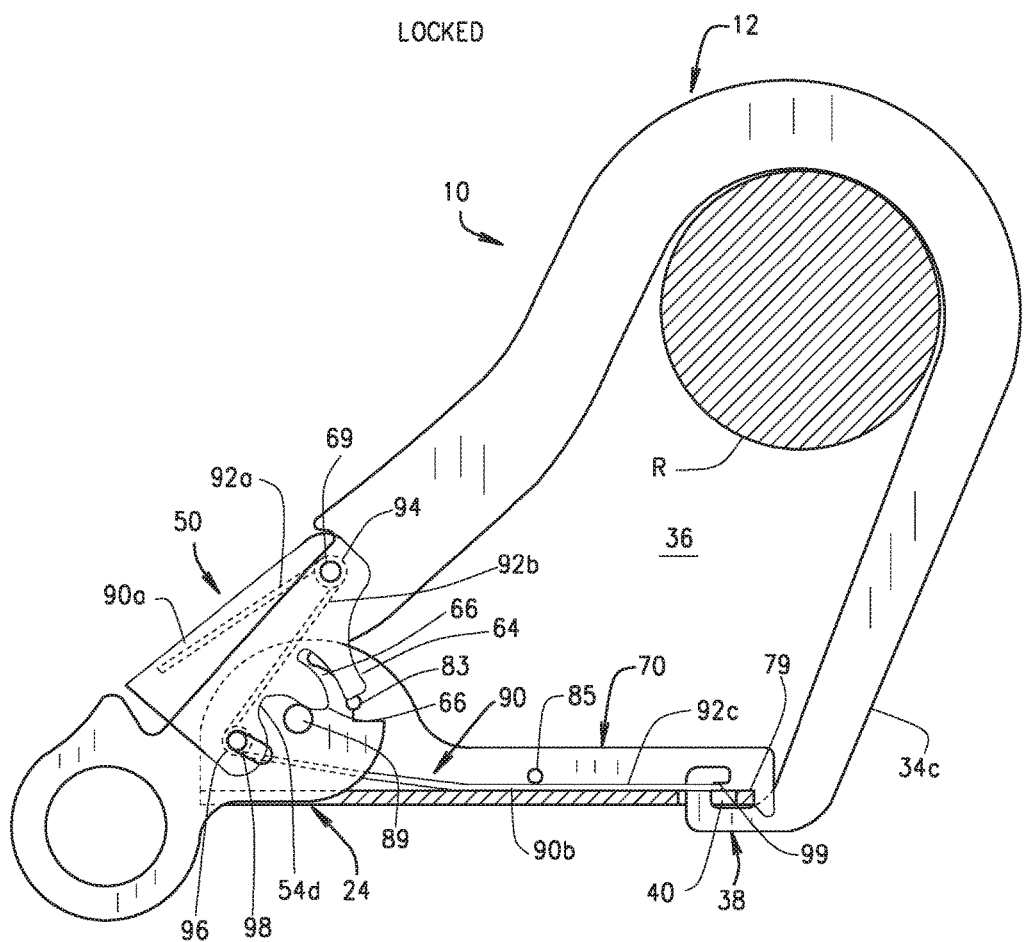
FIG. 9 line drawing of the snap hook assembly showing the assembly's various parts, with the snap hook assembly in a closed and locked position.
Figure 10:
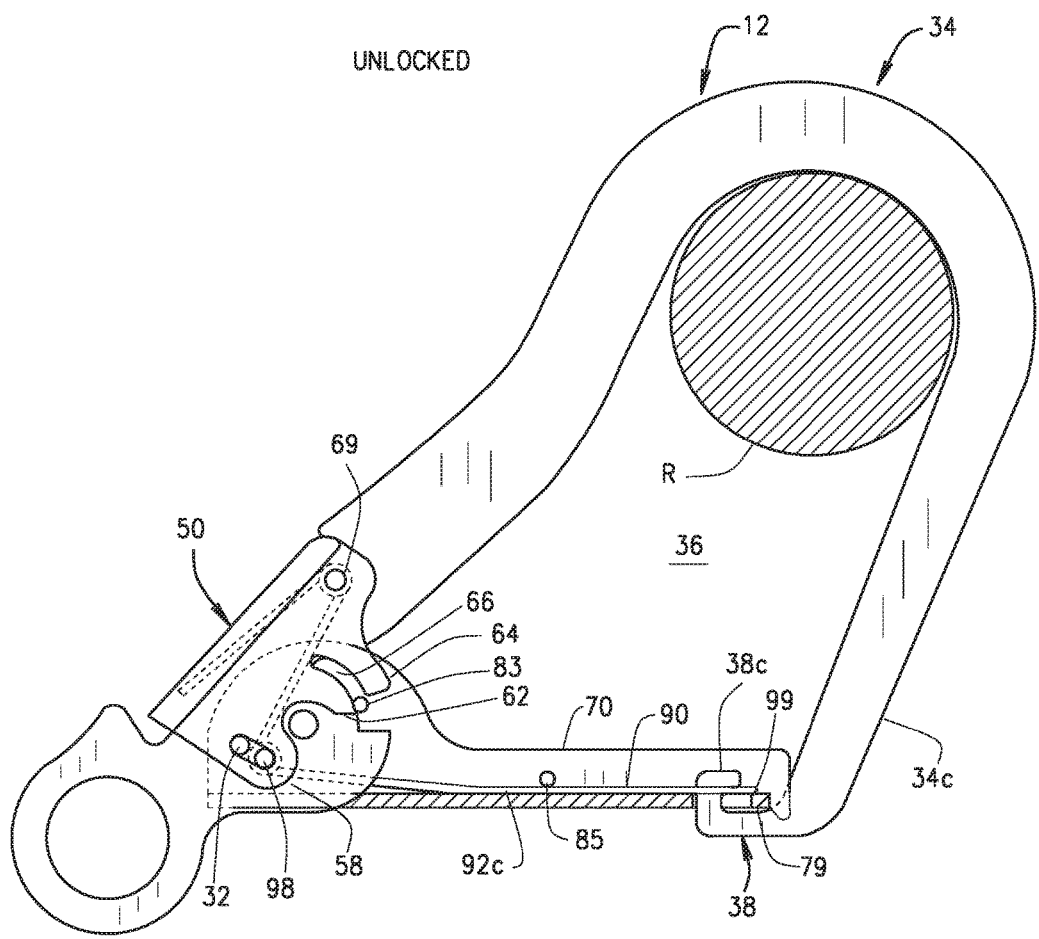
FIG. 10 is a line drawing of the snap hook assembly, with the snap hook assembly closed, but in an unlocked or release position.
Figure 11:
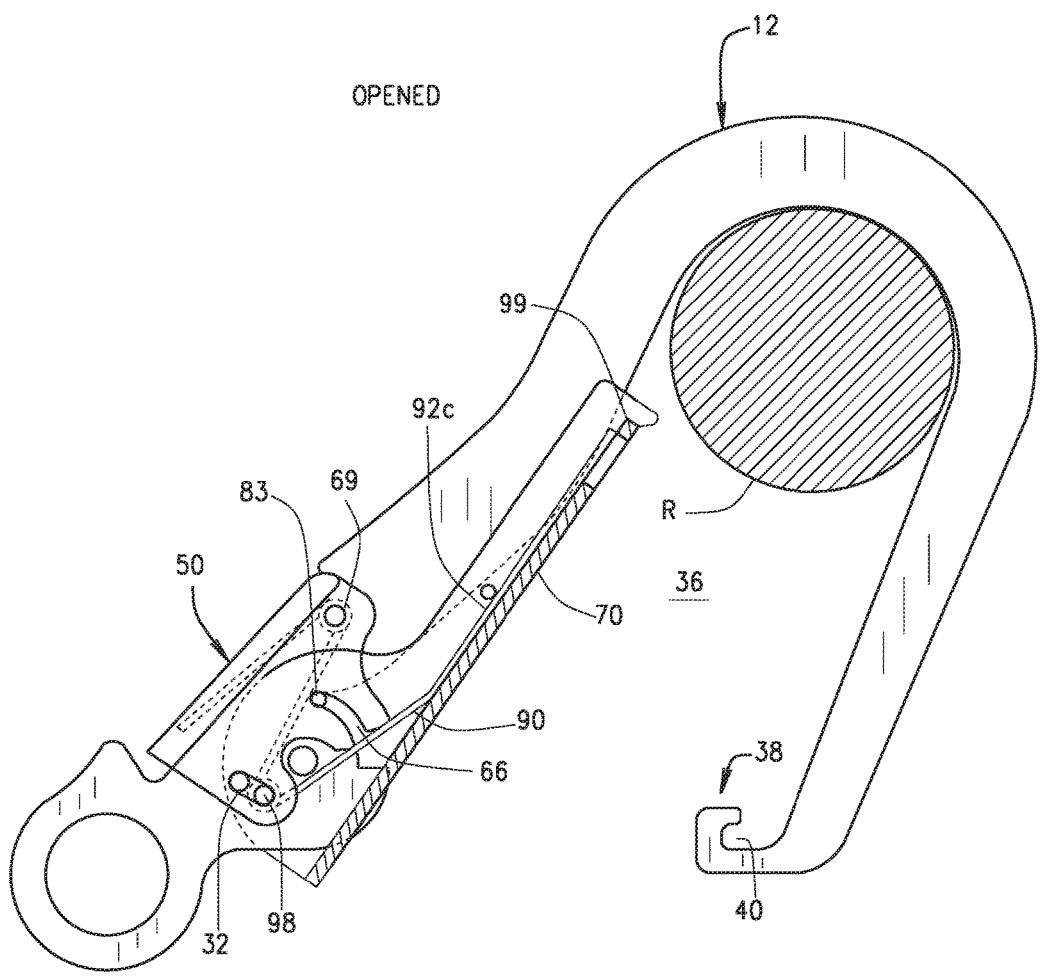
FIG. 11 is a line drawing of the snap hook assembly showing the snap hook assembly in an open position.
Figure 12:
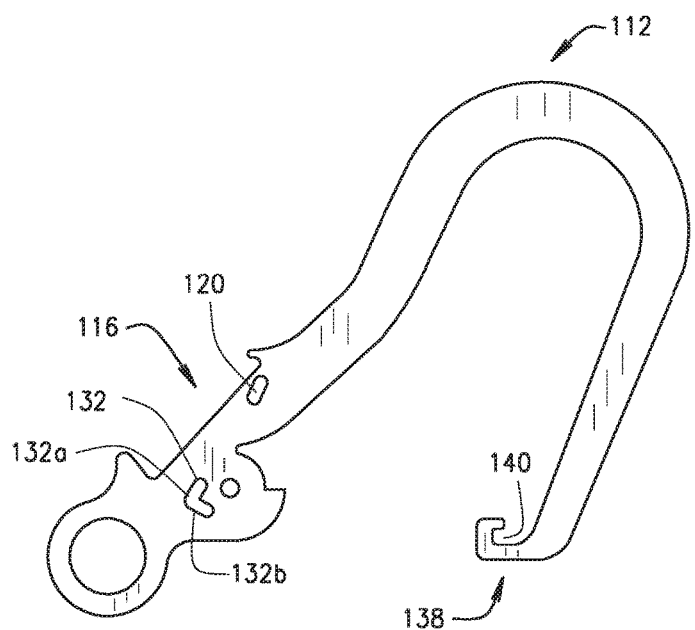
FIG. 12 is a side view of a body of a variation of the snap hook assembly.
Figure 14:
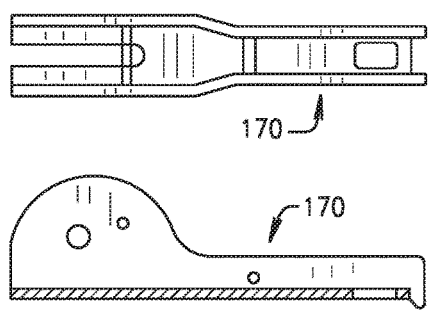
FIG. 14 contains top plan and cross-sectional views of a gate for the variation of the snap hook assembly.
Figure 13:
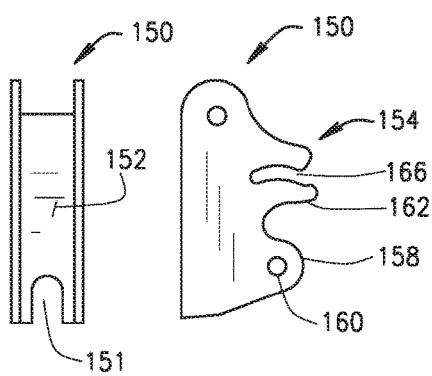
FIG. 13 contains side elevational and back elevational views of a trigger for the variation of the snap hook assembly.

A snap hook assembly 10 is shown generally in FIGS. 1 and 2, and the components of the snap hook assembly 10 are shown individually in FIGS. 3-4. FIGS. 9, 10, and 11 show the snap hook assembly in its closed and locked, closed and unlocked, and open states, respectively, with the hook positioned around a rebar R. The snap hook assembly 10 comprises a body 12, a trigger 50, a gate 70, and a spring 90 which is relied upon in part to maintain the gate in a closed position.

Turning to FIG. 3, the body 12 includes a connecting ring 14 at a bottom end thereof to which a lifeline can be connected. A neck 16 extends from the connecting ring 14, and as will be explained, forms a mounting area for the trigger and the gate. The neck 16 includes a cutout area 18 in an outer edge of the neck and which is positioned just above the connecting ring 14. A trigger mounting aperture 20 is formed in the neck near the top of the cutout area 18. The neck 16 further includes a gate mounting area 24 which extends from an inner edge of the neck 16. The gate mounting area is defined by a generally straight lower edge 26a which initially extends away from the neck just above the connecting ring 14. The lower edge 26a smoothly transforms into an arced inner edge 26b which curves upwardly to a generally straight top edge 26c which extends inwardly, and is generally parallel to the bottom edge 26a. An upper arced edge 26d extends from the end of the top edge 26c, and arcs outwardly, toward the outer edge of the neck 16. The arced edge 26d defines a radius, and the circles defined by the arced edges 26d and 26b are substantially concentric. The upper arced edge 26d effectively extends into the inner edge of the neck 16, such that a small inlet 28 is formed at the upper junction of the gate mounting area 24 and the inner edge of the neck 16. A gate mounting aperture 30 is formed at the center of the gate mounting area 24 and is substantially concentric with the circle defined by the arced edges 26b and 26d. Lastly, the gate mounting area includes a slot 32 below, and with respect to FIG. 3, slightly to the left of the gate aperture 30.

A hook portion 34 extends upwardly from the neck 16 and comprises a back section 34a extending from the neck, an arced section 34b extending from the end of the back section, and a front section 34c extending from the end of the arced section 34b. The front section 34c, with reference to FIG. 3, extends in a generally downward direction, and is shown to be generally parallel to the hook back section 34a. The hook portion 34 of the body thus defines a hook area 36 sized to receive the rebar, post, or anchor R (FIG. 9, 10). A locking arm 38 extends inwardly toward the neck 16 from the end 34d of the neck portion 34. The locking arm 38 includes a base 38a which extends from the end 34d of the hook front portion 34c towards the neck 16. A first leg 38b extends upwardly from the base 38a toward the hook arced section 34b of the hook portion. Lastly, the locking arm 38 includes a second leg 38c which extends from the end of the second portion toward the hook section portion, and is shown to be generally parallel to the base 38a. As can be seen, the locking arm 38 defines a small hook which extends from the end 34d of the hook front section 34c. The locking arm 38 base, first leg, and second leg, in combination, define a capture area 40. The end of the locking arm second leg is spaced from the hook portion forward section 34c to define an entrance to the capture area 40. The hook forward section 34c is sized (or has a length) such that the locking arm 38 and its capture area 40 are, with respect to FIG. 3, below the gate mounting aperture 30. That is, a line extending from the top of the locking arm (i.e., a line which would be an extension of the top surface of the locking arm second leg 38c) passes through the body mounting area below the gate mounting aperture 30.

Turning to FIG. 4, the trigger 50 includes a back wall 52 and two identical side walls 54 which extend generally perpendicularly from the back wall 52. As seen, the bottom ends of the side walls 54 are generally level with the bottom of the back wall 52; however, the side walls 54 are longer than the back wall 52, and thus, the upper ends of the side walls 54 are spaced from the upper end of the back wall 52. The side walls have a generally rectangular body 56 having a back edge 56a, a top edge 56b and a bottom edge 56c. The top and bottom edges 56b,c are generally parallel to each other, but are not perpendicular to the back edge, and define an angle about 80° to about 85° with the back edge. A lower semicircular protrusion 58 extends from the body at the front thereof. A connection hole 60 is formed at the approximate center of the protrusion 58. The trigger includes a lower arm 62 above the protrusion 58. The lower arm 62 has a sloped lower edge 62a and an arcuate, radius-defining upper edge 62b. The transition from the protrusion 58 to the front edge of the body, and then to the lower arm 62 defines a concavely radiused edge 56d. An upper arm 64 extends from the trigger body above the lower arm. The upper arm 64 includes a lower edge 64a and an upper edge 64b. The upper arm lower edge 64a is radiused and generally concentric with the lower arm upper edge 62b. The two arms thus define a radiused slot or channel 66. The circle defined by the channel 66 is generally concentric with the connection hole 60. The top edge 64b of the upper arm 64 curves upwardly to smoothly transition to the front edge of the body. A mounting hole 68 is formed below the top edge of the side wall body 56, approximately midway between the front and back edges of the side wall body 56.

The trigger 50, in cross-section, generally defines a U-channel, and is mounted to the body with the trigger back wall 52 received in the cutout 18 of the back edge of the body neck 16, with the side walls 54 extending toward the gate mounting area 24. The trigger 50 is pivotally mounted to the body 12 by a trigger axle 69, such as a pin, rivet, etc. which extends through the mounting hole 68 in a first of the trigger side walls 54, through trigger mounting hole 20 in the neck 16 of the hook body, and then through the mounting hole 68 in a second of the trigger side walls 54. As seen in FIG. 9, the trigger 50 is sized and shaped such that the trigger channel 66 is generally aligned with the upper edge 26*d* of the gate mounting area 24 of the hook body 12. Additionally, the connection hole 60 in the trigger lower protrusion 58 is generally aligned with the slot 32 in the hook trigger mounting area 24, and the lower edge 62*a* of the trigger lower arm 62 is above the hole 30 in the gate mounting area. The trigger mounting hole 68 is spaced both vertically and horizontally from the connection hole 60, such that pivotal movement of the trigger about the mounting hole 68 moves the connection hole 60 toward or away from the locking arm 38 of the body hook portion 34 along a path parallel to the slot 32.

The gate 70 is shown in FIG. 5. The gate 70 includes a lower wall 72 and mirror image side walls 74 extending upwardly from the lower wall. The gate 70 thus is generally U-shaped in cross-section. The lower wall 72 has a slot 76 extending forwardly from a back edge of the upper wall and an opening 78 proximate the front end of the gate. The opening 78 defines a cross-member 79 at the forward end of the gate lower wall 72. The slot 76 is sized to receive the gate mounting area 24 of the hook neck 16; and the opening 78 is sized to pass over the third portion 38*c* of the locking arm 38 at the end of the hook forward portion 34*c*. The gate side walls 74 include an elongate, generally rectangular body portion 80 with a semi-circular projection 82 at the rear of the gate 70. A pivot hole 84 is formed in the projection 82; however, the hole 84 is off-center relative to the circle defined by the upper edge 82*a* of the projection 82. A lock pin 83 extends between the side walls' projections 82. The lock pin 83 is sized to be received in the trigger slot 66, and is positioned on the gate 70 to be aligned with the trigger upper arm 64 when the snap hook is in the closed and locked position (as seen in FIG. 9).

Figure 8:
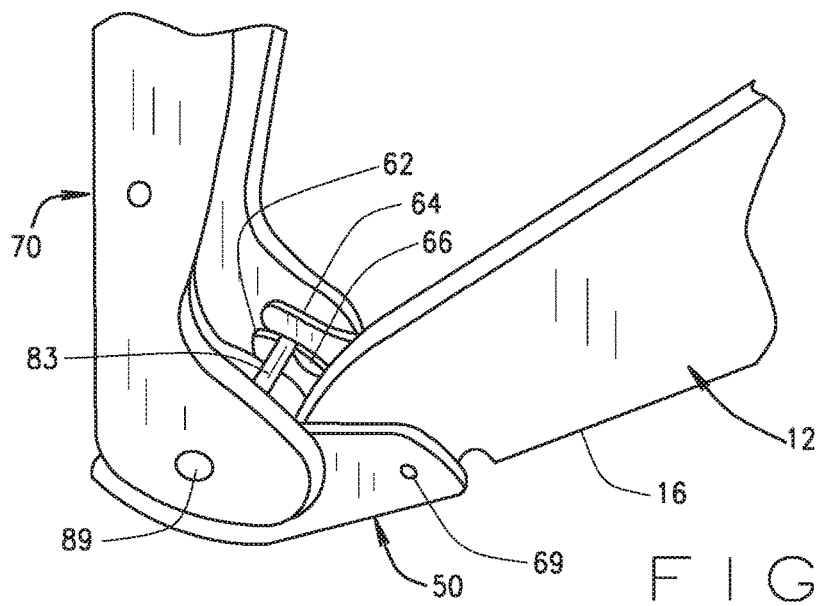
FIG. 8 is an enlarged fragmentary perspective view showing a gate locking pin engaged with a locking channel of the trigger.

The gate side walls 74 are slightly longer than the gate bottom wall 72, and the forward ends of the side walls thus extend slightly beyond the end of the bottom wall. A finger 86 extends downwardly from the forward end of each side wall beyond the end of the bottom wall. Lastly, the gate includes an outwardly extending protrusion 88 behind the pivot hole 84 of each projection 82. In top plan, the gate 70 is wider at its back than at its front. The gate 70 can thus be defined as having a back portion 70*a* (which includes the semi-circular projection 74), a front portion 70*b*, and a transition portion 70*c*. The walls in the back and front portions are parallel to each other, and the walls in the transition portion slope inwardly. The gate is pivotally mounted to the hook body 12 by a gate axle 89, such as a rivet, pin, etc. which passes through the pivot hole 84 of one gate wall, through the gate mounting hole 30 in the hook gate mounting area 24, and then through the pivot hole 84 of the other gate wall. When the gate 70 is mounted to the hook body 12, the sides 54 of the trigger 50 are received between the projections 74 of the gate 70, as best seen in FIGS. 2 and 8. That is, the gate 70 sandwiches the trigger 50. As can be appreciated, the gate 70 can pivot between a closed position (FIGS. 9 and 10) and an open position (FIG. 11). In the closed position, the gate 70 extends across the opening of the hook area 36, the second leg 38*b* of the locking arm 38 extends through the hole 78 at the end of the gate 70, and the forward cross-member 79 of the gate rests on the locking arm base 38*a*, outside of the capture area 40. In the open position, the gate 70 is swung upwardly, as seen in FIG. 11, to be adjacent the neck 16 and back section 34*a* of the hook portion 34. In its fully open position, the U-channel of the gate extends around the hook body neck 16 and hook portion back section 34*a*. As can be appreciated, the gate 70 only pivots about its axle 89. It does not slide or otherwise move laterally relative to the hook body 12.

The spring 90 of the snap hook assembly 10, as noted above, is relied upon to maintain the snap hook assembly 10 in the locked position. The spring is a multi-legged or complex torsion spring comprising a first portion 90*a* which is contained in the trigger 50 and a second portion 90*b* which is received in, and extends along, the gate 70. The spring first portion 90*a* includes first and second legs 92*a, b* which are joined by a first coil 94 wrapped around the trigger axle 69. The spring legs 92*a, b* extend downwardly from the coil 94. The spring first portion biases the trigger to a "locked" position. The spring second portion 90*b* comprises a third leg of the spring 92*c* which is joined to the spring's second leg 92*b* by a second coil 96 which is wrapped around a spring pin 98. The spring pin 98 extends through the connection holes 60 in the trigger lower projection 58 and the slot 32 in the neck 16 of the snap hook body 12. The third leg 92*c* extends along the lower wall 72 of the gate 70. The second portion of the spring 90 biases the gate to the closed position. The opposite sides of the third leg 92*c* are connected, at their ends, by a spring cross member 99 which is sized to be received in the capture area 40 of the locking arm 38. The cross-member 99 can be reinforced, and can thus have a larger diameter than the rest of the spring third leg 92*c*. The third leg 92*c* of the spring has a length, such that the end of the spring is aligned with the opening 78 in the gate lower wall 72. Additionally, the width of the spring, as defined by the distance between the opposite sides of the third leg 92*c* is sized to enable the spring cross-member 99 to be received in the capture area 40 of the locking hook 38 of the snap hook body 12. As can be appreciated, the spring is effectively physically connected to only the hook body 12 (by means of pins 94 and 98) and to the trigger 50 (by means of pin 94). The spring 90 is not positively connected to the gate 70. However, the spring acts on both the trigger 50 and the gate 70, and thus effectively defines a double torsion spring. The first part 90*a* of this double torsion spring comprises the spring first leg 92*a*, the spring first coil 94, and the spring second leg 92*b*. This first portion 90*a* of the spring 90 biases the trigger to the lock position shown in FIG. 9, and pressing or actuation of the trigger (as will be described below) is accomplished against the bias force of the spring. The second portion 90*b* of the double torsion spring comprises the spring second leg 92*b*, the second coil 98, and the spring third leg 92*c*. The spring second portion 90*b* biases the gate downwardly, to its closed position.

Figure 6:
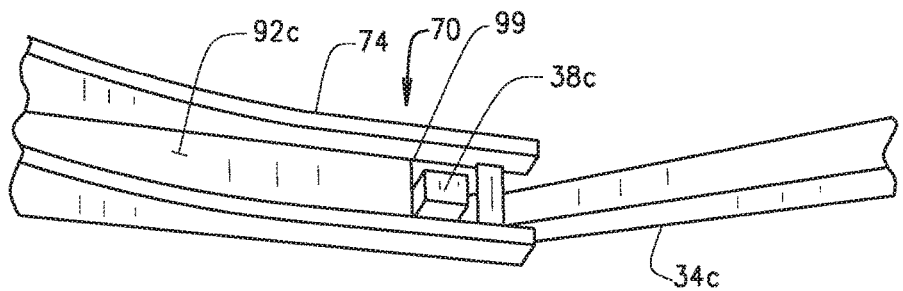
FIG. 6 is an enlarged fragmentary perspective view of the snap hook assembly showing a spring lock mechanism captured by the locking arm of the hook body.

The snap hook assembly 10 is shown in FIG. 9 in its closed and locked position. In this state, the gate 70 extends across the opening of the hook area 36 between the neck 16 with the gate cross-member 79 resting on the locking arm base 38*a*. Thus, the snap hook assembly 10 cannot be removed from the bar R. The cross-member 99 at the end of the spring 90 is received in the capture area 40 of the locking arm 38 (also shown in FIG. 6), and the gate lock pin 83 is aligned with the end of the upper arm 64 of the trigger 50. The interaction of the gate locking pin 83 with the trigger upper arm 64 and the capture of the spring cross-member 99 in the capture area 40 of the locking arm 38 will substantially prevent pivotal movement of the gate. Hence, the gate will not be able to move from its closed position (FIG. 9) to its opened position (FIG. 11).

Figure 7:
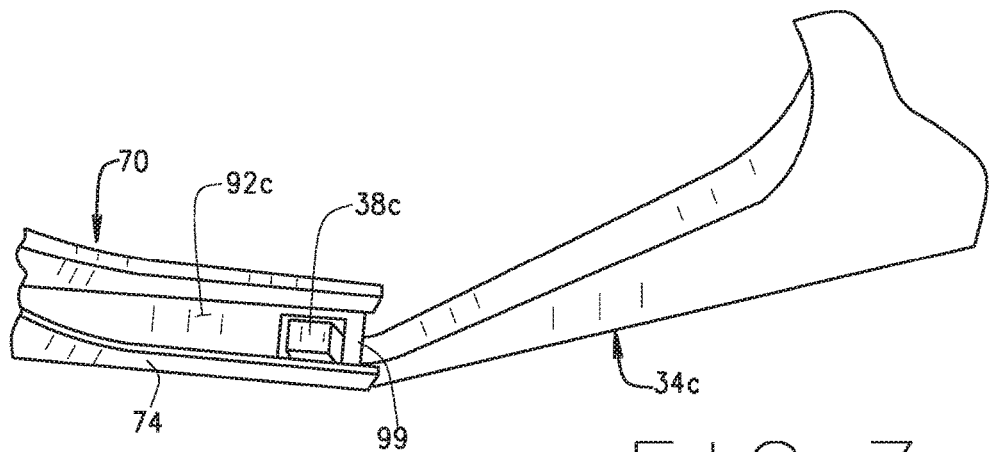
FIG. 7 is an enlarged fragmentary perspective view of the snap hook assembly showing a spring lock mechanism disengaged from the locking arm of the hook body.

The snap hook assembly 10 is moved to an unlocked (but still closed) position by pressing or squeezing the trigger 50 against the snap hook body 12 to a release position, as is shown in FIG. 10. Squeezing the trigger 50 to its release position causes the trigger 50 to pivot about its axle 69, thereby causing the bottom of the trigger, and in particular, the lower projection 58 to move forwardly (i.e., toward the locking arm 38 at the end of the hook portion 34). The forward movement of the trigger projection 58 moves the spring pin 98 along the slot 32 in the neck 16 of the snap hook body 12. This causes the third spring leg 92c to move forwardly relative to the gate 70 to a position in which the spring cross-bar 99 is clear of the locking hook arm 38c and aligned with the opening 42 to the capture area (also shown in FIG. 7). Further, the pivoting of the trigger moves the trigger channel 66 into alignment with the gate locking pin 83. With the gate locking pin 83 aligned with the trigger channel 66 and the spring 90 extended to its unlocked position, the gate 70 is no longer locked in place, and can be pivoted against the bias of the spring 90, as shown in FIG. 3, to the opened position. FIG. 8 shows the snap hook assembly with the gate locking pin 83 moved partway along the trigger channel 66.

In the opened position, shown in FIG. 11, the gate locking pin 83 has moved substantially the full length of the trigger channel 66, and the spring pin 98 remains in the forward position relative to the hook body slot 32. The interaction of the lock pin 83 with the trigger channel 66 prevents the trigger from returning to its lock (or at rest) position and thus maintains the third spring leg 92c in its forward extended position (or prevents the third spring leg 92c from returning to its lock position from the release position). Thus, when the gate is released to close the hook, the third spring leg 92c will still be in the forward position, so that the spring cross-member 99 will clear the finger 38c of the locking hook 38. Thus, the snap hook is closed and locked first by releasing the gate 71, allowing the bias of the spring leg 92c to move the gate to the closed position. As noted, the spring cross-member 99 is in the extended position, and will clear the locking hook finger 38c. This will return the snap hook to the position shown in FIG. 10. By then releasing the trigger 50, the bias of the first portion of the spring will return the trigger back to the position shown in FIG. 9, moving the third spring leg 92c rearwardly, and drawing the spring cross-member 99 into the capture area 40 of the locking arm 38, and moving the trigger upper arm 66 into alignment with the gate locking pin 83. As can be appreciated, the spring 90 serves three functions—the spring first portion 90a biases the trigger to its lock position, the spring second portion 90b biases the gate to its closed position, and the third leg 92c of the spring functions as a lock mechanism to at least in part prevent pivotal motion of the gate when the snap hook assembly is in its closed and locked position.

It is noted that the gate 70 is shown with a pin 85 extending between the side walls 74 of the gate. The third leg 92c of the spring 90 is positioned between this pin 85 and the bottom wall 72 of the gate 70. The pin 85 is not necessary to secure the spring in the snap hook assembly 10, but rather is provided to reduce the likelihood that a user will try to remove the spring to defeat the locking functionality of the snap hook assembly 10.

A variation of the snap hook is shown in FIGS. 12-18. The snap hook assembly 110 is substantially identical to the snap hook assembly 10. The snap hook body 112 has two differences from the snap hook body 12. The trigger pivot hole 20 is replaced with a slot 120, and the slot 32 in which the spring pin 98 slides has been replaced with an L-shaped slot 132 having a first leg 132a which is generally parallel to the slot 120 and a second leg 132b which is generally perpendicular to the first leg 132a, and which corresponds in function to the slot 32 of the snap hook body 12. The trigger 150 is substantially identical to the trigger 50, and differs only in that the trigger 150 includes a slot 151 extending from the bottom edge of the back wall 152 of the trigger, and that the shape of the bottom arm 162 in the side walls 154 has been altered slightly. Lastly, the gate 170 is identical to the gate 70, and the spring 190 is identical to the spring 90 of the snap assembly 10. The changes to the snap hook body 112 and the trigger 150 relative to the snap hook body 12 and trigger 50 allow for the trigger to move along the neck 116 of the snap hook body 112. This change requires a double action to release and unlock the gate. First, the trigger 150 must be moved downwardly relative to the body 112, and then, the trigger 150 can be squeezed to release the gate 170 to allow pivoting of the gate.

Figure 15:
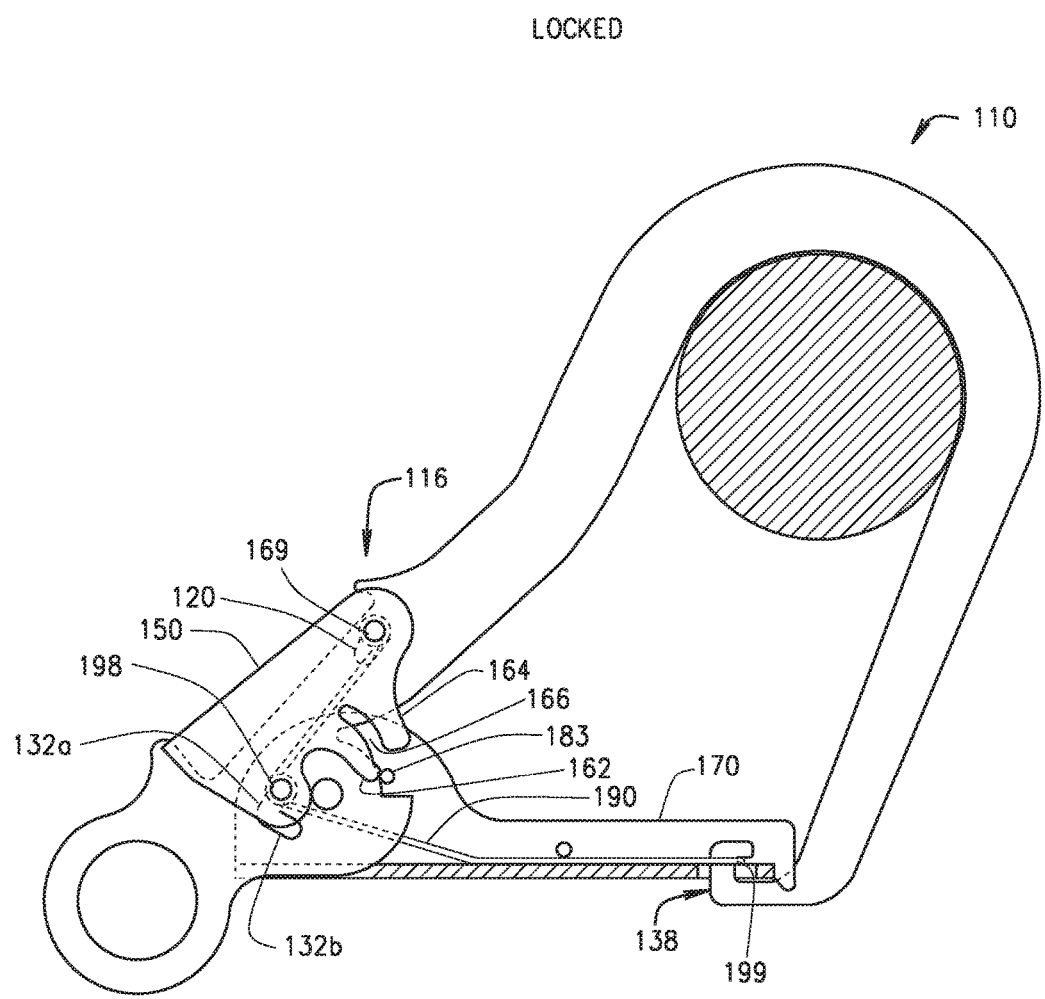
FIG. 15 is a line drawing of the variation of the snap hook assembly showing the assembly's various parts, with the snap hook assembly in a closed and locked position.
Figure 16:
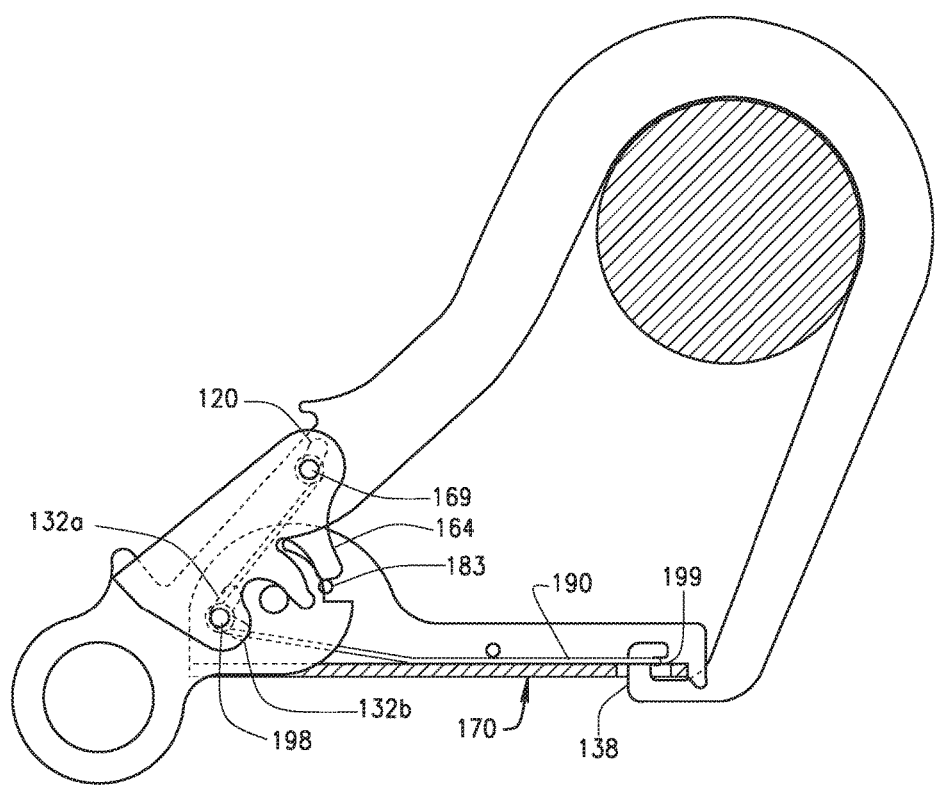
FIG. 16 is a line drawing of the snap hook assembly, with the snap hook assembly closed, but in an released, but still locked, position.
Figure 17:
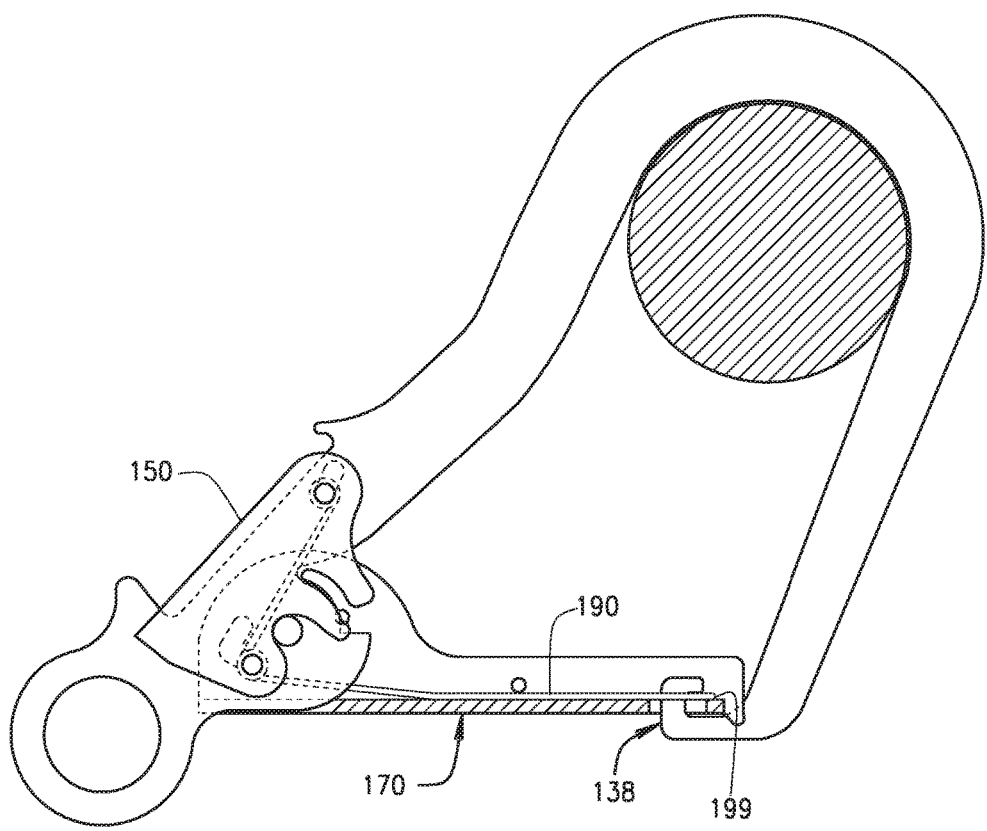
FIG. 17 is a line drawing of the snap hook assembly showing the snap hook assembly in an unlocked, but still closed, position.
Figure 18:
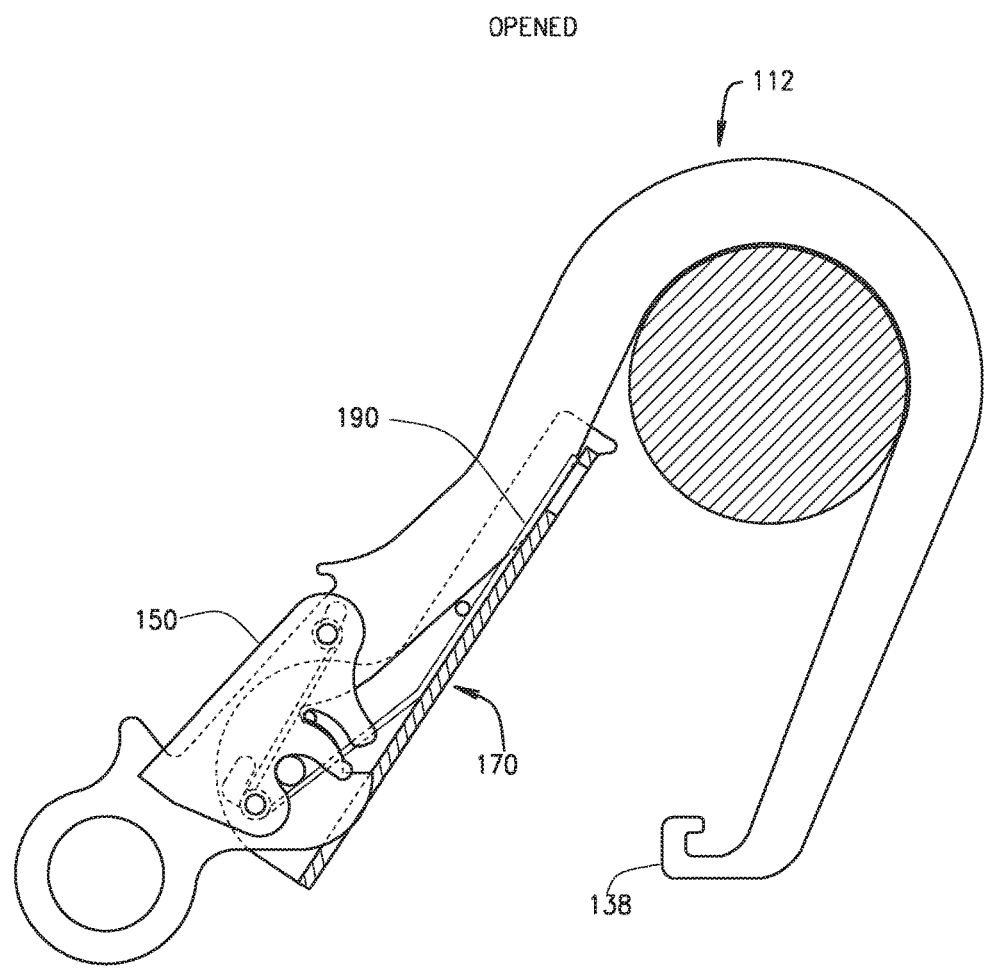
FIG. 18 is a line drawing of the snap hook assembly showing the snap hook assembly in an open position.

The snap hook assembly 110 is shown in the closed and locked position in FIG. 15. In this position, the trigger pivot axle 169 is at the top of the slot 120; the spring pin 198 is at the top of the leg 132b of the L-slot 132; the gate locking pin 183 is aligned with the end of the trigger lower arm 162; and the spring cross-member 199 is captured in the capture area 140 of the locking arm 138. With the spring pin 198 out of alignment with the slot leg 132b, the spring pin 198 (which passes through the connection hole 160 of the trigger projection 158) prevents the trigger 150 from pivoting about the trigger axle 169. It will be appreciated that the spring 190 biases the trigger to this upper position in the slot 120. To enable the trigger 150 to pivot, it must be moved axially (downwardly) along the spring neck 116, moving the trigger pivot axle 169 and the spring pin 198 to the bottom of their respective slots 120 and 132a. In this position, as seen in FIG. 16, the spring pin 198 is aligned with the slot leg 132b, and the trigger can therefore rotate about the trigger axle 169. Additionally, the movement of the trigger 150 aligns the trigger upper arm 164 with the gate locking pin 183. In this "released" position, the snap hook is in the same position as the "unlocked" position for the snap hook assembly 10, as shown in FIG. 10. From this point, the trigger 150 can be squeezed, and operation of the snap hook assembly 110 proceeds as described above in conjunction with the snap hook assembly 10. The slot 151 in the trigger back wall 152 slides past (or receives) a portion of the hook body 112 as the trigger is moved to its lower position. The slot could be eliminated by reducing the length of the back wall 152. Although the snap hook assembly 110 is moved from the first position in which pivotal movement of the trigger is prevented (FIG. 15) to the second position in which pivotal movement is enabled (FIG. 16) by moving the trigger 150 downwardly relative to the neck. The snap hook assembly 110 could alternatively be constructed so that the trigger 150 is moved upwardly relative to the neck to move the assembly from the first position to the second position.

Figure 19:
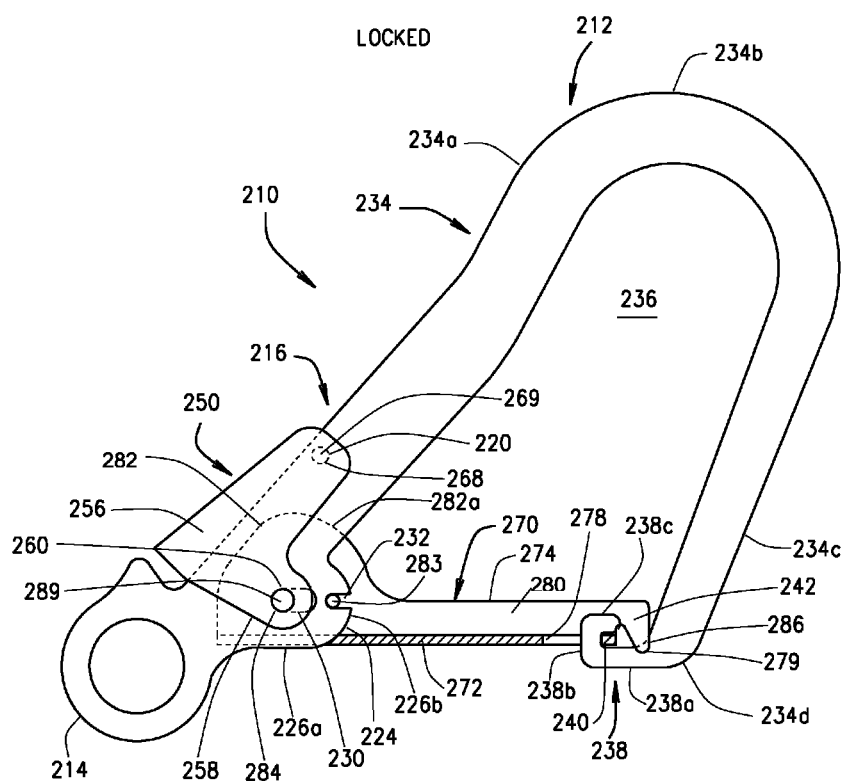
FIG. 19 is a line drawing of a second embodiment of the snap hook assembly showing the assembly's various parts, with the snap hook assembly in a closed and locked position.
Figure 20:
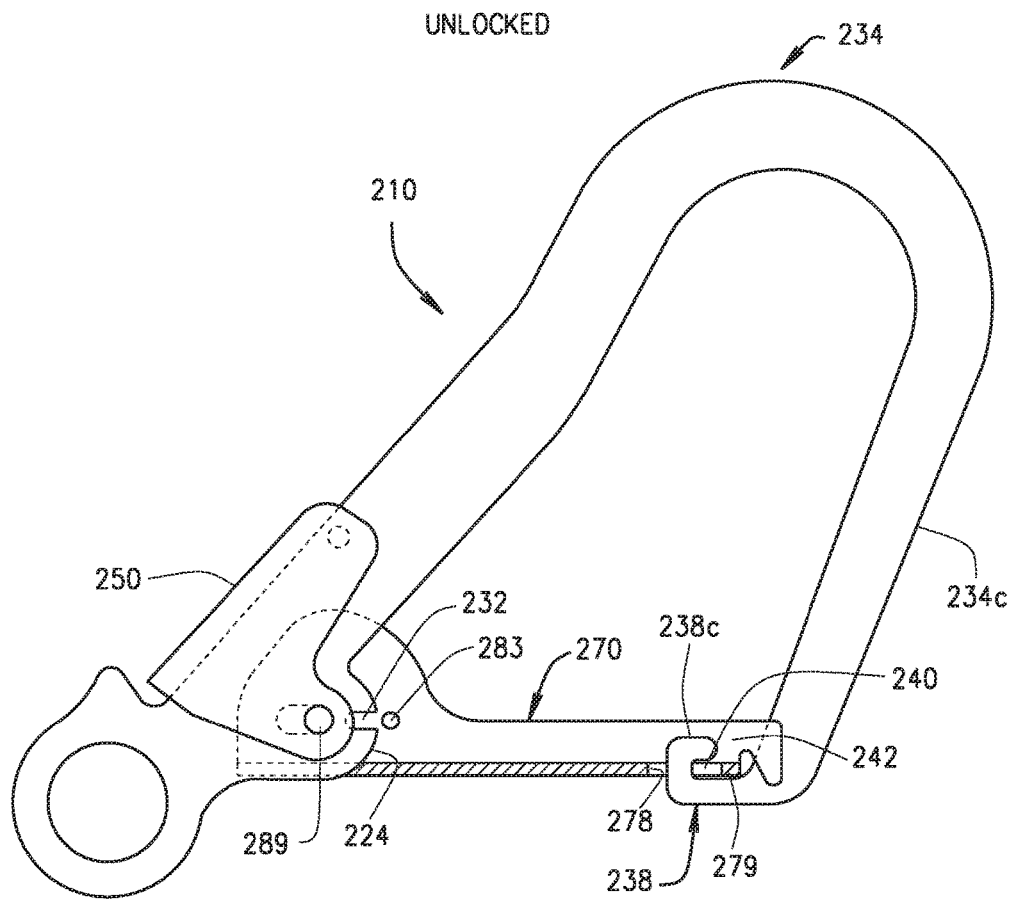
FIG. 20 is a line drawing of the snap hook assembly of FIG. 19, with the snap hook assembly closed, but in an unlocked condition.
Figure 21:
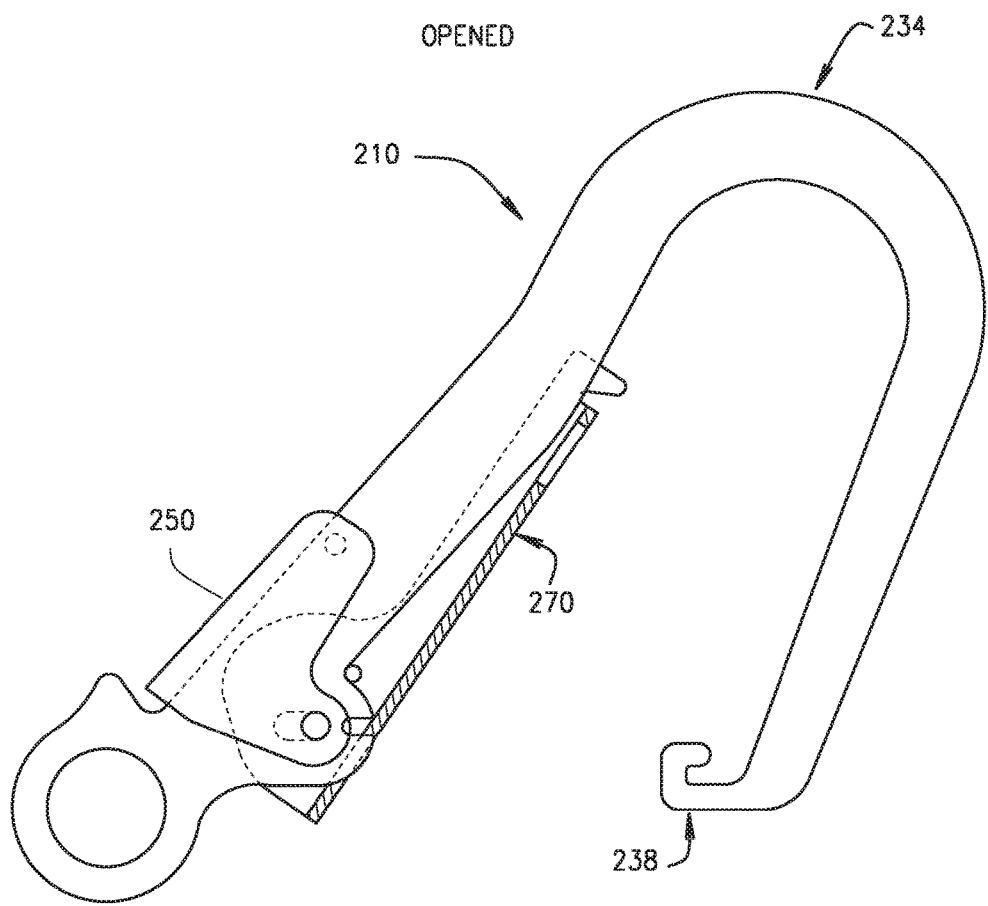
FIG. 21 is a line drawing of the snap hook assembly of FIG. 19 showing the snap hook assembly in an open condition.

An alternative snap hook assembly 210 is shown in FIGS. 19-21 in its locked, unlocked, and open positions, respectively. The snap hook assembly 210 includes a hook body 212, a trigger 250, a gate 270, a trigger biasing member (not shown), and a gate biasing member (not shown).

The body 212 is similar to the body 12, 112 of snap hook assemblies 10, 110. The body 212 includes a connecting ring 214 at a bottom end thereof to which a lifeline can be connected. A neck 216 extends from the connecting ring 214, and as will be explained, forms a mounting area for the trigger and the gate. A lock aperture 220 is formed in the neck. The neck 216 further includes a gate mounting area 224 which extends from an inner edge of the neck. The gate mounting area is defined by a generally straight lower edge 226a which extends away from the neck just above the connecting ring 214. The lower edge 226a smoothly transitions into an arced inner edge 226b which curves upwardly and around to join the inner edge of the neck 216. The curved edge 226b defines an arc of approximately 140°. A gate pivot slot 230 is formed at the center of the gate mounting area 224 and has a forward end which is substantially concentric with arc defined by the edge 226b. Lastly, the gate mounting area 224 includes a slot 232 extending inwardly from the edge 226b of the inner gate mounting area and which is generally co-linear with the slot 230. The slot 232, however, is narrower than the slot 230.

A hook portion 234 extends upwardly from the neck 216 and comprises a back section 234a extending from the neck, an arced section 234b extending from the end of the back section, and a front section 234c extending from the end of the arced section 234b. The front section 234c, with reference to FIG. 19, extends in a generally downward direction and is generally parallel to the back section 234a. The hook portion 234 thus defines a hook area 236 sized to receive the rebar, post, or anchor. At the end 234d of the hook front section 234c, the body 212 includes a locking arm or hook 238 which extends toward the neck 216. The locking arm 238 includes a base 238a which extends from the end 234d of the hook front section 234c towards the neck 216. A first leg 238b extends upwardly from the base toward the hook arced section 234b. Lastly, the locking arm 238 includes a second leg 238c which extends from the end of the first leg toward the hook front portion. As can be seen, the locking arm 238 defines a small hook which extends from the end 234d of the hook front portion 234c. The locking arm 238 base, first leg, and second leg, in combination, define a capture area 240, and the gap 242 between the end of the second leg 238c and the hook forward section 234c defines an entrance to the capture area 240.

The trigger 250 includes a back wall 252 and two identical side walls 254 which extend generally perpendicularly from the back wall 252. As seen, the bottom ends of the side walls are generally level with the bottom of the back wall 252; however, the side walls 254 are longer than the back wall 252, and thus, the upper ends of the side walls 254 are spaced from the upper end of the back wall 252. The side walls have a generally rectangular body 256 having a back edge 256a, a top edge 256b and a bottom edge 256c. The top and bottom edges 256b, c are generally parallel to each other, but are not perpendicular to the back edge, and define an angle about 80° to about 85° with the back edge. A lower semicircular protrusion 258 extends from the body at the front thereof. A connection hole 260 is formed at the approximate center of the protrusion 258. A mounting hole 268 is formed below the top edge of the side wall body 56, approximately midway between the front and back edges of the side wall body 56.

The trigger 250, in cross-section, generally defines a U-channel, and is mounted to the body with the trigger back wall 252 adjacent the back side of the body neck 216, with the side walls 254 extending toward the gate mounting area 224. The trigger 250 is pivotally mounted to the body 212 by a trigger axle 269, such as a pin, rivet, etc. which extends through the mounting hole 268 in a first of the trigger side walls 254, through mounting hole 220 in the neck 216 of the hook body, and then through the mounting hole 268 in a second of the trigger side walls 254. The trigger 250 is sized and shaped such that aperture 260 in the trigger lower protrusion 258 is generally aligned with the slot 230 in the hook trigger mounting area 224. Like the triggers 50 and 150, the mounting hole 268 is vertically and horizontally offset from the connection hole 260, such that pivotal motion of the trigger about the trigger axle 269 moves the connection hole 260 toward or away from the locking arm 238.

The gate 270 is substantially similar to the gate 70, 170. It includes a lower wall 272 and mirror image side walls 274 extending upwardly from the lower wall. The gate 270 thus is generally U-shaped in cross-section. The lower wall 272 has a slot 276 extending forwardly from a back edge of the upper wall and an opening 278 proximate the front end of the gate. The opening 278 defines a cross-member 279 at the forward end of the gate lower wall 272. The slot 276 is sized to receive the gate mounting area 224 of the hook neck 216; and the opening 278 is sized to pass over the second leg 238c of the lock arm 238 at the end 234d of the hook forward section 234c. The gate side walls 274 include an elongate, generally rectangular body portion 280 with a semi-circular projection 282 at the rear of the gate 270. A pivot hole 284 is formed in the projection 282, however, the hole 284 is off-center relative to the circle defined by the upper edge 282a of the projection 282. A lock pin 283 extends between the side walls' projections 282. The lock pin 283 is sized to be received in the trigger slot 232.

The side walls 274 are slightly longer than the bottom wall 272, and the forward ends of the side walls are thus slightly beyond the end of the bottom wall. A finger 286 extends downwardly from the forward end of each side wall beyond the end of the bottom wall. Lastly, the gate includes an outwardly extending protrusion 288 behind the pivot hole 284 of each projection 282. In plan, the gate 270 is wider at its back than at its front. The gate 270 can thus be defined has having a back portion 270a, a front portion 270b, and a transition portion 270c. The walls in the back and front portions are parallel to each other, and the walls in the transition portion slope inwardly. The gate is pivotally mounted to the hook body 212 by a gate axle 289, such as a rivet, pin, etc. which passes through the pivot hole 284 of one gate wall, through the gate mounting slot 230 in the hook gate mounting area 224, and then through the pivot hole 284 of the other gate wall. When the gate 270 is mounted to the hook body 12, the sides 254 of the trigger 250 are received between the projections 274 of the gate 270. That is, the gate 270 sandwiches the trigger 250. As can be appreciated, the gate 270 can pivot between a closed position (FIGS. 19 and 20) and an open position (FIG. 21). In the closed position, the gate extends across the opening of the hook area 236, the second leg 238c of the locking arm 38 extends through the hole 278 of the gate, and the forward cross-member 279 of the gate rests on the arm portion 238a and is captured in the locking area 240 of the locking arm 238. In the open position, the gate 270 is swung upwardly, as seen in FIG. 21, to be adjacent the neck 216 and back portion 234a of the hook 234. In its fully open position, the U-channel of the gate extends around the hook body neck 216 and hook portion back portion 234a.

The trigger biasing member (not shown) can be a torsion spring, a helical spring, or other biasing member. If a helical spring is used, the spring is positioned between the back edge of the body neck 116 and the back wall 252 of the trigger. The trigger biasing member will thus bias the trigger to the lock position shown in FIG. 19. The gate biasing member (not shown) can be torsion spring with one leg extending along the lower wall 272 of the gate and with its coil wrapped around the gate pivot axis 289.

When in the locked position (FIG. 19), the trigger 250 is biased to an outward lock position and the gate 270 is in a rearward, locked position with the gate cross-member 279 captured in the capture area 240 of the locking arm 238 of the hook body 212. In addition, the gate locking pin 283 is received in the locking slot 232 of the trigger projection 224. The interaction of the gate cross-member 279 with the lock arm 238 and the locking pin 283 with the locking slot 232 will prevent the gate from pivoting from the closed to the open position. To unlock the gate 270, the trigger 250 is squeezed or pressed against the neck 216 of the body 212 to an unlocked position (FIG. 20). Because the gate 270 is connected to the trigger 250 by means of the gate axle 289, the pivoting motion of the trigger will move the gate forwardly, toward the front section 234c of the hook portion 234. Thus, as seen in FIG. 20, in this forward, unlocked position, the gate locking pin 238 has been disengaged from the trigger locking slot 232, and the gate cross-member 279 has been moved out of the capture area 240 to be aligned with the entrance 242 to the capture area 240. In this unlocked position, the gate can be pivoted up to its opened position, as shown in FIG. 21.

As can be appreciated, a main difference between the snap hook assemblies 10, 110 on the one hand, and the snap hook assembly 210 on the other is that gate 270 of the snap hook assembly 210 both moves axially (or longitudinally) and pivots, whereas the gates 70, 170 of the snap hook assemblies 10, 110 only pivot. The longitudinal movement of the gate 270 allows for the gate, itself, to be captured by the locking arm 238, and thus, the snap hook assembly 210 does not require a separate locking member.

As various changes could be made in the above constructions without departing from the scope of the invention, it is intended that all matter contained in the above description or shown in the accompanying drawings shall be interpreted as illustrative and not in a limiting sense. For example, it may be possible to replace the single double torsion spring 90, 190 with two torsion springs, one which corresponds to the first part of the double torsion spring and one which corresponds to the second part of the double torsion spring. This variation is illustrative only.

The invention claimed is:

1. A snap hook assembly comprising:
    a hook body; the body comprising a neck portion; a gate mounting area extending from an inner edge of said neck portion, and a hook portion extending from the neck portion; said hook portion comprising:
        a back section extending from said neck; a curved section extending from a top of said back section, and a forward section extending from said curved section; a distal end of said forward section defining an end of said hook portion; whereby said hook portion defines a hook area; and
        a locking arm extending from said end of said hook portion toward said neck portion; said locking arm comprising a base portion extending from said end of said hook portion, a first leg extending upwardly from said base portion, and a second leg extending from an end of said first leg toward said forward section of said hook portion; whereby said locking arm base, first leg and second leg define a capture area; a gap between an end of said second leg and said hook portion forward section defining an entrance to said capture area;
    a gate having a first end and a second end and comprising a lower wall, opposed side walls extending from said lower wall, and a lock pin extending between said opposed side walls; said gate first end being pivotally mounted to said hook body at said gate mounting area; said gate second end defining an opening sized to pass over said locking arm second leg and a gate cross-member sized to pass through the entrance to said capture area; said gate being selectively pivotally movable between a closed position in which said gate cross-member rests on said locking arm base to close an opening to said hook area and an open position in which said opening to said hook area is opened to allow said snap hook to be connected to, or removed from, an anchor point;
    a locking member extending along said gate; said locking member comprising a cross-member sized to be received in said capture area of said body locking arm; said locking member being movable relative to said gate and said locking arm between a locking position in which said locking member cross-member is received in said capture area to prevent pivotal motion of said gate and a release position in which cross-member of said locking member is aligned with the entrance to said capture area so as to not interfere with pivotal movement of said gate;
    a trigger comprising a back surface and opposed side walls extending from said back surface; said trigger side walls defining aligned channels extending rearwardly from a forward edge of said side walls, said channels being sized to receive said lock pin of said gate; said trigger being pivotally mounted to said hook body at a trigger pivot point and being connected to said locking member at a point spaced from said trigger pivot point such that pivotal movement of said trigger results in translational motion of said locking member; said trigger being movable between (i) a lock position in which said locking member is in its said locking position and in which said lock pin of said gate is not aligned with said channels of said trigger side walls and (ii) a second position in which said locking member is in its release position and in which said lock pin of said gate is aligned with said channels of said trigger side walls; whereby said selective pivoting movement of said trigger between its said lock and release positions moves said locking member between its said locked and released positions and brings said channels of said side walls into alignment with said lock pin of said gate such that said lock pin can pass through said channels as said gate pivots from its said closed position to its said open position;
    a gate biasing member for biasing said gate to said closed position; and
    a trigger biasing member for biasing said trigger to said first position.

2. The snap hook assembly of claim 1 wherein said gate biasing member comprises a torsion spring having a first leg and a second leg; said first leg of said torsion spring extending along said gate and defining said locking member.

3. A snap hook assembly comprising:
    a hook body; the body comprising a neck portion and a hook portion extending from the neck portion; said hook portion comprising:
        a back section extending from said neck; a curved section extending from a top of said back section, and a forward section extending from said curved section; a distal end of said forward section defining an end of said hook portion; whereby said hook portion defines a hook area; and
        a locking arm extending from said end of said hook portion toward said neck portion; said locking arm comprising a base portion extending from said end of said hook portion, a first leg extending upwardly from said base portion, and a second leg extending from an end of said first leg toward said forward section of said hook portion; whereby said locking arm base, first leg and second leg define a capture area; a gap between an end of said second leg and said hook portion forward section defining an entrance to said capture area;

a gate having a first end and a second end; said gate first end being pivotally mounted to said hook body; said gate second end defining an opening sized to pass over said locking arm second leg and a gate cross-member sized to pass through the entrance to said capture area; said gate being selectively pivotally movable between a closed position in which said gate cross-member rests on said locking arm base to close an opening to said hook area and an open position in which said opening to said hook area is opened to allow said snap hook to be connected to, or removed from, an anchor point;

a trigger pivotally mounted to said hook body at a trigger pivot point and connected to said locking member at a point spaced from said trigger pivot point; said trigger being movable between a lock position in which said cross-member of said locking member is received in said capture area of said hook portion locking arm and a second position in which cross-member of said locking member is in its release position; whereby said selective pivoting movement of said trigger between its said lock and release positions moves said locking member between its said locked and released positions; and a one piece complex torsion spring having a first leg, a second leg, and a third leg; said first and second legs being joined by a first coil and said second and third legs being joined by a second coil; said first and second legs of said complex torsion spring define a gate biasing member for biasing said gate to said closed position, and wherein said second and third legs of said complex torsion spring define a trigger biasing member for biasing said trigger to said first position; said first leg engaging a surface of said trigger to bias said trigger to its said first position; said third leg extending along said gate.

4. The snap hook assembly of claim 1 wherein the hook body comprises a connecting ring at a bottom of said neck portion.

5. The snap hook assembly of claim 1 wherein said base portion of said locking arm extends from said end of said hook portion of said body toward said gate mounting area of said body.

6. The snap hook assembly of claim 1 wherein said trigger channel is an arcuate channel; said trigger channel and said gate locking pin being positioned on said trigger and gate, respectively, such that when said trigger is in its said release position, said gate locking pin is aligned with said trigger channel to permit movement of said gate from its said closed position to its said open position; and wherein when said trigger is in its said lock position, said gate locking pin is not aligned with said channel and abuts a forward surface of said trigger, such that pivotal motion of said gate from its said closed position is substantially prevented.

7. The snap hook assembly of claim 1 wherein said hook body includes an elongate slot; said snap hook assembly including a connecting pin which connects said locking member to said trigger; said connecting pin extending through said slot and being fixed at opposite ends to said trigger, said slot defining a path of travel for said connecting pin, such that pivotal movement of said trigger moves said connecting pin along said slot to move said locking member between its said locking member's locked and unlocked positions.

8. The snap hook assembly of claim 7 wherein said trigger is movable along said hook body between a first position in which said trigger can pivot between said lock and release positions and a second position in which pivotal motion of said trigger is prevented; whereby, when in said second position, said gate is in its closed position and said locking member cross-member is captured in said locking arm capture area.

9. The snap hook assembly of claim 7 wherein said slot of body is a first slot; said body further including a second slot extending from said first slot in a direction such that said first and second slots, in combination, define a generally L-shaped slot; whereby, said trigger is movable along a path defined by said second slot generally parallel to an axis of said neck between (i) a first position in which said connecting pin is aligned with said first slot to enable said trigger to be activated, and (ii) a second position in which said connecting pin is out of alignment with said first slot and in which said trigger cannot be activated.

10. A snap hook assembly comprising:

a hook body; the body comprising a neck portion, a gate mounting area extending from an inner edge of said neck portion, and a hook portion extending from the neck portion; said body defining a gate pivot slot in said gate mounting area, said gate pivot slot defining an axis; said hook portion comprising:

a back section extending from said neck; a curved section extending from a top of said back section, and a forward section extending from said curved section; a distal end of said forward section defining an end of said hook portion; whereby said hook portion defines a hook area; and a locking arm extending from said end of said hook portion toward said neck portion; said locking arm comprising a base portion extending from said end of said hook portion and which is generally parallel to said axis of said gate pivot slot, a first leg extending upwardly from said base portion, and a second leg extending from an end of said first leg toward said forward section of said hook portion; whereby said locking arm base, first leg and second leg define a capture area; a gap between an end of said second leg and said hook portion forward section defining an entrance to said capture area;

a gate having a first end and a second end; said gate first end being connected to said hook body at said first end of said gate for both pivotal and longitudinal movement relative to said hook body by means of a pivot member which extends through said gate pivot slot and defines a pivot axis for said gate; said gate second end defining an opening sized to pass over said locking arm second leg and a gate cross-member sized to pass through the entrance to said capture area and to be received in said capture area; said gate being pivotally movable between a closed position in which said gate cross-member rests on said locking arm base to close an opening to said hook area and an open position in which said opening to said hook area is opened to allow said snap hook to be connected to, or removed from, an anchor point; said gate further being movable laterally when in said closed position between a locked position in which gate cross-member is received in said capture area to prevent movement of said gate from said closed position to said open position and a release position in which said gate opening is aligned with said body locking arm second leg and said gate cross-member is aligned with said opening to said capture area whereby said gate may be pivoted between its said closed and opened positions;

a trigger pivotally mounted to said hook body and pivotally connected to said gate; said trigger being connected to said gate by said gate pivot member; said trigger being movable between a lock position and a release position; whereby, when said trigger is in its lock position, said gate cross-member is received in said capture area of said hook portion locking arm, and when said trigger is in its said release position, said gate is in its said release position; whereby said selective movement of said trigger between its said locked and release positions moves said gate between its said locked and released positions;

a gate biasing member for biasing said gate to said closed position; and a trigger biasing member for biasing said trigger to said first position.

11. The snap hook assembly of claim 10 wherein said gate comprises a locking pin extending through a plane in which said gate pivots; said hook body comprising a second slot extending rearwardly from an inner surface of said body, said second slot being aligned with said gate locking pin; said gate locking pin being positioned on said gate such that when said gate is in its locked position, said gate locking pin is received in said second slot to prevent pivotal motion of said gate and when said gate is in its release position, said gate locking pin is outside of said second slot to permit pivotal motion of said gate.

12. The snap hook assembly of claim 3 further including a locking member extending along said gate; said locking member comprising a cross-member sized to be received in said capture area of said body locking arm; said locking member being movable relative to said gate and said locking arm upon pivotal movement of said trigger between a locking position in which said locking member cross-member is received in said capture area to prevent pivotal motion of said gate and a release position in which cross-member of said locking member is aligned with the entrance to said capture area so as to not interfere with pivotal movement of said gate.

13. The snap hook assembly of claim 12 wherein said third leg of said one piece complex torsion spring extending along said gate defines said locking member.

14. The snap hook assembly of claim 1 wherein said trigger biasing member comprises a torsion spring having a first leg and a second leg.

15. The snap hook assembly of claim 2 wherein said trigger biasing member comprises a torsion spring having a first leg and a second leg.

* * * * *